United States Patent
Burke et al.

(10) Patent No.: US 10,294,831 B2
(45) Date of Patent: May 21, 2019

(54) CAM PHASING ASSEMBLIES WITH ELECTROMECHANICAL LOCKING CONTROL AND METHOD THEREOF

(71) Applicant: Schaeffler Technologies AG & Co. KG, Herzogenaurach (DE)

(72) Inventors: Steven Burke, Fort Gratiot, MI (US); Andrew Mlinaric, Lakeshore (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/631,787

(22) Filed: Jun. 23, 2017

(65) Prior Publication Data
US 2018/0371963 A1    Dec. 27, 2018

(51) Int. Cl.
| | |
|---|---|
| *F01L 1/02* | (2006.01) |
| *F01L 1/344* | (2006.01) |
| *F01L 1/46* | (2006.01) |
| *F16D 3/10* | (2006.01) |
| *F01L 1/352* | (2006.01) |

(52) U.S. Cl.
CPC ....... *F01L 1/34406* (2013.01); *F01L 1/34413* (2013.01); *F01L 1/352* (2013.01); *F01L 1/46* (2013.01); *F16D 3/10* (2013.01); *F01L 1/022* (2013.01); *F01L 2001/34453* (2013.01); *F01L 2001/34459* (2013.01); *F01L 2001/34469* (2013.01); *F01L 2001/3522* (2013.01)

(58) Field of Classification Search
CPC ... F01L 2001/34453; F01L 2001/34469; F01L 1/352; F01L 2001/34456; F01L 2001/34459; F01L 2001/34466; F01L 2001/34476
See application file for complete search history.

(56) References Cited

U.S. PATENT DOCUMENTS

| | | | | |
|---|---|---|---|---|
| 4,403,579 | A * | 9/1983 | Young | F02P 7/10 123/146.5 A |
| 6,328,006 | B1 | 12/2001 | Heer | |
| 6,948,467 | B2 * | 9/2005 | Lipke | F01L 1/022 123/90.15 |
| 7,377,245 | B2 | 5/2008 | Morii et al. | |
| 7,506,623 | B2 * | 3/2009 | Schafer | F01L 1/352 123/90.11 |

(Continued)

FOREIGN PATENT DOCUMENTS

| | | |
|---|---|---|
| EP | 1813783 A1 | 8/2007 |
| KR | 101129069 B1 | 3/2012 |

*Primary Examiner* — Jeremy R Severson

(57) ABSTRACT

A cam phasing control motor assembly, including: an electric motor with a hollow drive shaft; an actuating pin passing through the hollow drive shaft; an engagement feature; and a displacement assembly. For a camshaft locking mode: the displacement assembly displaces the actuating pin in a first axial direction to non-rotatably connect the engagement feature with a bolt non-rotatably connected to a camshaft; and the camshaft is arranged to non-rotatably connect to an input gear for a gearbox phasing unit, the input gear arranged to receive torque from an engine. For a phase adjusting mode: the displacement assembly displaces the actuating pin in a second axial direction, opposite the first axial direction, to disconnect the engagement feature from the bolt; and the camshaft is arranged to rotate with respect to the input gear.

20 Claims, 7 Drawing Sheets

(56) References Cited

U.S. PATENT DOCUMENTS

| | | |
|---|---|---|
| 8,651,076 B2 | 2/2014 | Walliser et al. |
| 8,677,961 B2 * | 3/2014 | Fischer .................. F01L 1/352 |
| | | 123/90.17 |
| 8,683,965 B2 * | 4/2014 | Pierik ...................... F01L 1/34 |
| | | 123/90.15 |
| 2005/0081808 A1 | 4/2005 | Tani et al. |
| 2013/0008398 A1 | 1/2013 | Stoltz-Douchet et al. |
| 2015/0033906 A1 | 2/2015 | Kimus et al. |

\* cited by examiner

CAM PHASING ASSEMBLIES WITH ELECTROMECHANICAL LOCKING CONTROL AND METHOD THEREOF

TECHNICAL FIELD

The present disclosure relates to a cam phasing control motor assembly with locking control to fix a camshaft position at shutdown of an engine, and to a cam phasing control assembly with the cam phasing control motor assembly. The present disclosure also relates to a method for operating the cam phasing control motor assembly in the cam phasing control assembly.

BACKGROUND

A known problem for electric camshaft phasers is "drift" of the rotor relative to the stator immediately or shortly after engine shut-down. For example, immediately or shortly after engine shutdown, torque may be transmitted to the rotor in sufficient magnitude to cause the electric camshaft phaser to drift, or shift away from an intended control angle of the rotor with respect to the stator due to a lack of inherent resisting torque in the electric camshaft phaser or inherent friction associated with the electric motor and gearbox combination in the electric camshaft phaser. For example, if the camshaft comes to a stop while a valve spring is loaded, the camshaft is free to rotate to relieve the load on the spring and the electric cam phasing system cannot prevent this shift from occurring. The rotational direction and magnitude of the residual torque and inherent friction are unpredictable; therefore, the rotation and eventual final control angle of the rotor due to the residual torque from the camshaft or the inherent friction cannot be predicted. For known electric camshaft phasers, during shutdown of an electric cam phasing system, it is necessary to provide power to the electric motor during an engine off scenario to hold a gearbox for the phaser at a constant cam timing position. Providing the power is a drain on the energy system for the vehicle housing the phaser.

SUMMARY

According to aspects illustrated herein, there is provided a cam phasing control motor assembly, including: an electric motor with a hollow drive shaft; an actuating pin passing through the hollow drive shaft; an engagement feature; and a displacement assembly. For a camshaft locking mode: the displacement assembly displaces the actuating pin in a first axial direction to non-rotatably connect the engagement feature with a bolt non-rotatably connected to a camshaft; and the camshaft is arranged to non-rotatably connect to an input gear for a gearbox phasing unit, the input gear arranged to receive torque from an engine. For a phase adjusting mode: the displacement assembly displaces the actuating pin in a second axial direction, opposite the first axial direction, to disconnect the engagement feature from the bolt; and the camshaft is arranged to rotate with respect to the input gear.

According to aspects illustrated herein, there is provided a cam phasing control motor assembly, including: an electric motor with a hollow drive shaft; a connection element non-rotatably connected to the hollow drive shaft and arranged to connect to a gearbox phasing unit, the gearbox phasing unit including an input gear arranged to receive torque from an engine; an actuating pin passing through the hollow drive shaft; an engagement feature non-rotatably connected to the connection element; a resilient element engaged with the engagement feature; and an actuator. For a camshaft locking mode, the actuator displaces the actuating pin and the engagement feature in a first axial direction to non-rotatably connect the engagement feature with a bolt non-rotatably connected to a camshaft. For a phase adjusting mode, the resilient element displaces the engagement feature in a second axial direction, opposite the first axial direction, to enable relative rotation between the connection element and the bolt.

According to aspects illustrated herein, there is provided a cam phasing control assembly, including a gearbox phasing unit including an input gear arranged to receive torque from an engine, and an output gear arranged to non-rotatably connect to a camshaft; and a cam phasing control motor assembly including an electric motor with a hollow drive shaft, an actuating pin passing through the hollow drive shaft, an engagement feature and a displacement assembly. For a camshaft locking mode, the displacement assembly displaces the actuating pin and the engagement feature in a first axial direction to non-rotatably connect the engagement feature with a bolt non-rotatably connected to a camshaft. For a phase adjusting mode, the displacement assembly displaces the engagement feature in a second axial direction, opposite the first axial direction, to enable relative rotation between the camshaft and the input gear.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 7:
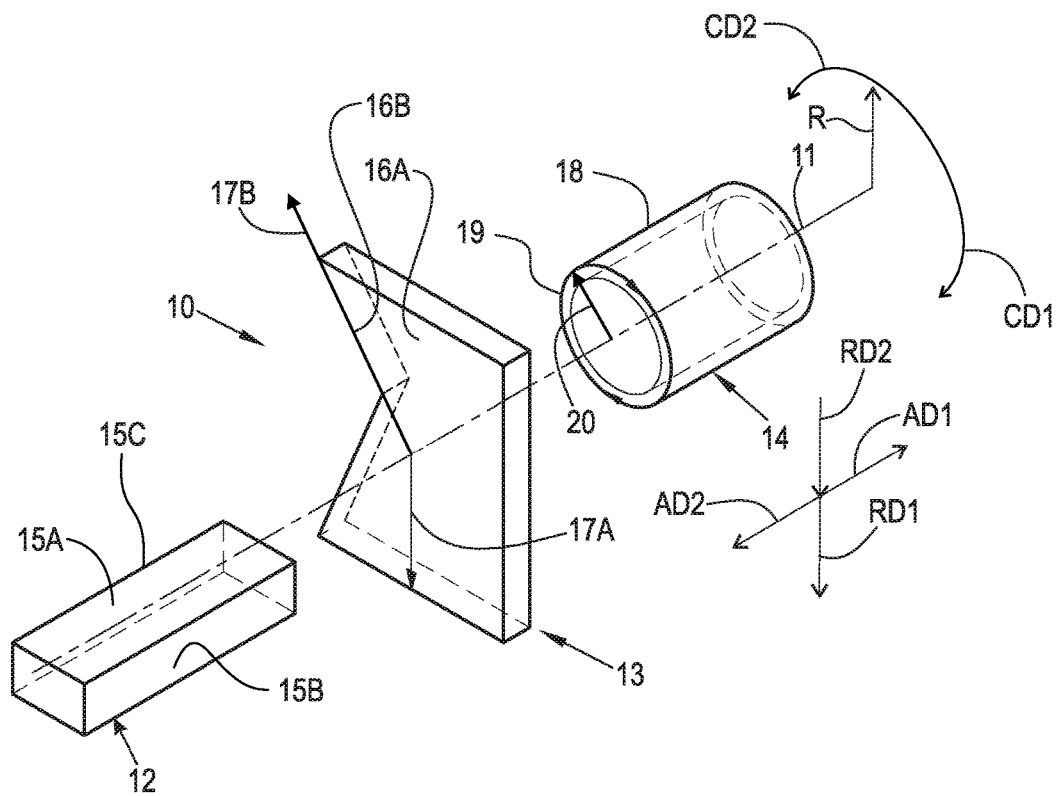

FIG. 7 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
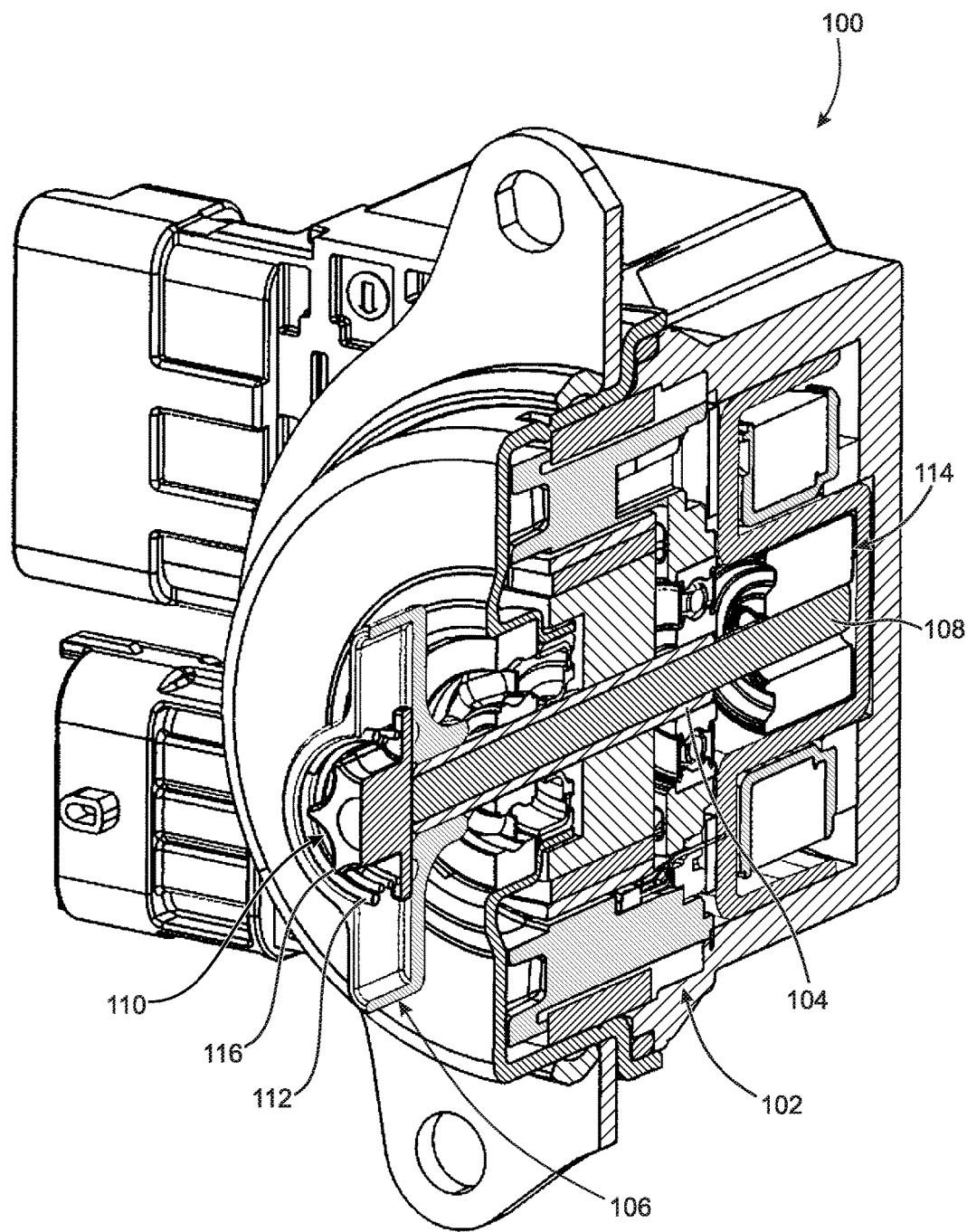
FIG. 1 is a perspective cross-sectional view of a cam phasing control motor assembly with camshaft locking.

FIG. 1 is a perspective cross-sectional view of cam phasing control motor assembly 100 with camshaft locking.

Figure 2:
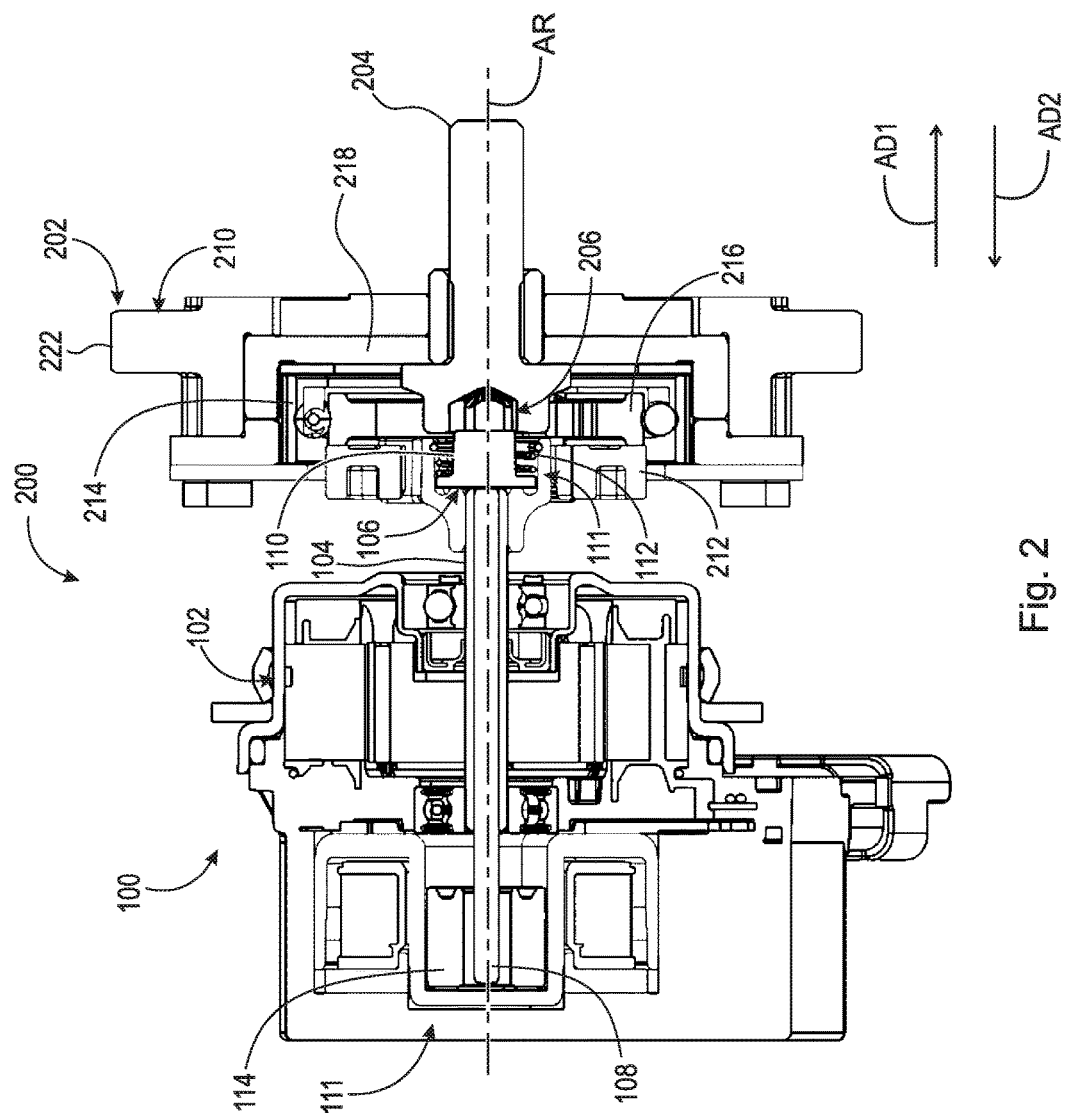
FIG. 2 is a cross-sectional view of a cam phasing control assembly, including the cam phasing control motor assembly of FIG. 1, in a phase adjusting mode.

FIG. 2 is a cross-sectional view of cam phasing control assembly 200, including cam phasing control motor assembly 100 of FIG. 1, in a phase adjusting mode. The following should be viewed in light of FIGS. 1 and 2. Assembly 100 includes axis of rotation AR; electric motor 102 with hollow drive shaft 104; connection element, or paddle, 106 non-rotatably connected to shaft 104; actuating pin 108 passing through shaft 104; engagement feature 110 non-rotatably connected to paddle 106; and displacement assembly 111. In an example embodiment, assembly 111 includes resilient element 112; and actuator 114. Pin 108 is engaged with feature 110, and element 112 is engaged with feature 110 and paddle 106. In an example embodiment, paddle 106 includes protrusions 116.

By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required. By one component "engaged with" another component, we mean that the one component is in direct contact with the other component or the components are in contact with a mechanically solid intermediary or ancillary part. For example, a washer or coating could be disposed between the two components.

Resilient element 112 can be any resilient element known in the art, for example a wrap spring. Actuator 114 can be any actuator known in the art fulfilling the functions described for actuator 114, for example actuator 114 is an electric actuator. In an example embodiment, an electric actuator 114 is a solenoid actuator with a first state for displacing pin 108 in direction AD1 and a second state for displacing pin 108 in direction AD2. Each time electric actuator 114 is energized, or receives a control signal, the actuator switches between the first and second states.

The discussion below is directed to assembly 111 including element 112 and actuator 114; however, it should be understood that the discussion is applicable to other configurations of components accomplishing the functions described for assembly 111, element 112 and actuator 114.

Figure 3:
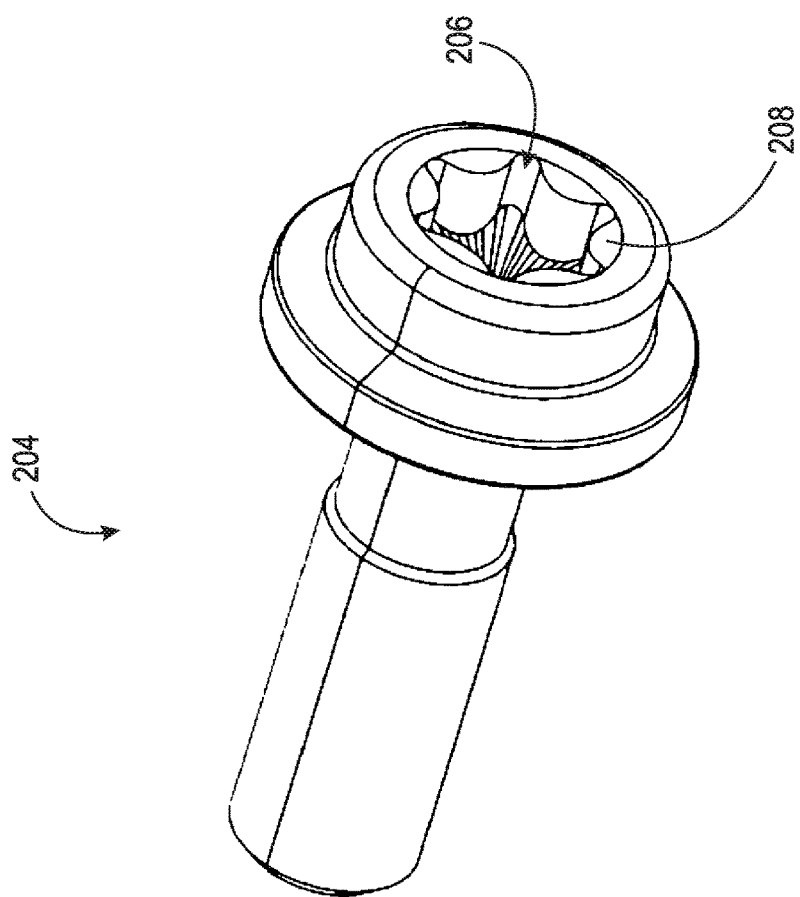
FIG. 3 is a perspective view of a bolt in FIG. 2.

FIG. 3 is a perspective view of a bolt in FIG. 2.

Figure 4:
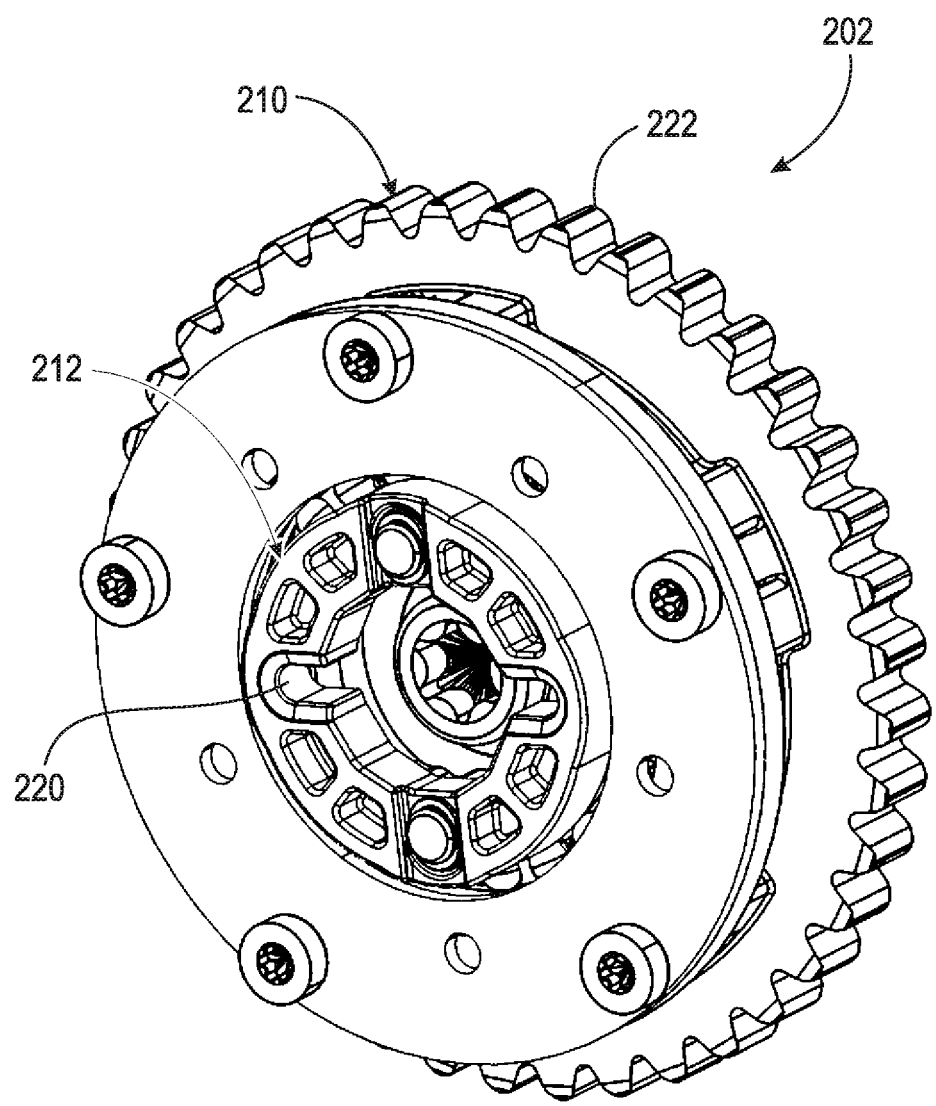
FIG. 4 is a perspective view of a gearbox phasing unit in FIG. 2.

FIG. 4 is a perspective view of a gearbox phasing unit in FIG. 2.

Figure 5:
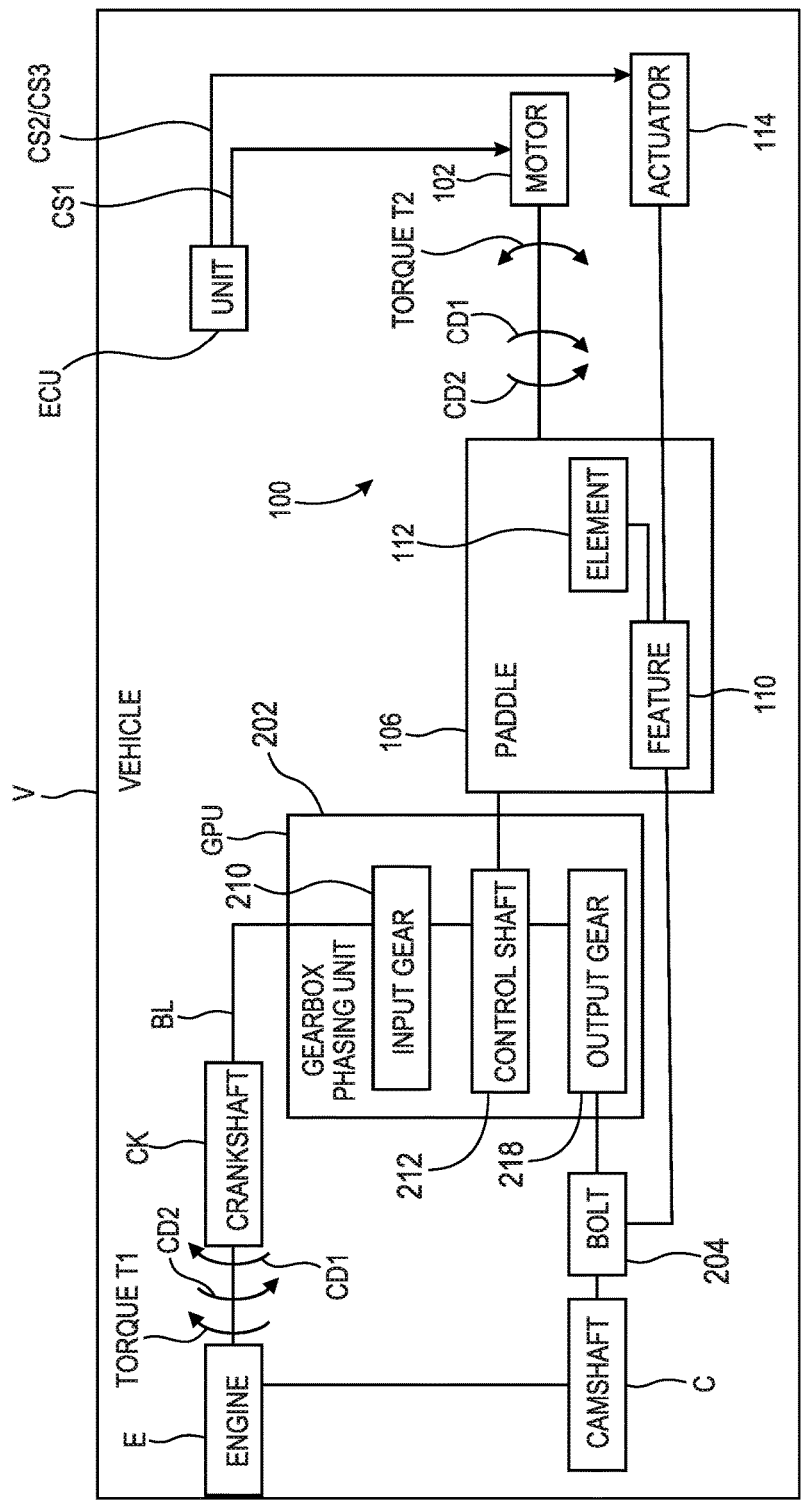
FIG. 5 is a block diagram of a vehicle including the cam phasing control assembly of FIG. 2.

FIG. 5 is a block diagram of a vehicle including the cam phasing control assembly of FIG. 2. The following should be viewed in light of FIGS. 1 through 5. Cam phasing control assembly 200 includes assembly 100, gearbox phasing unit 202 and bolt 204. Bolt 204 non-rotatably connects to camshaft C. In an example embodiment, bolt 204 includes recess 206 with slots 208. Gearbox phasing unit 202 can be any radial gearbox phasing unit known in the art, including, but not limited to: a planetary gear unit; an elliptical gear unit, and a harmonic drive unit. In an example embodiment, unit 202 includes input gear 210, control shaft 212, flexible gear 214, rotor 216, and output gear 218. Control shaft 212 includes slots 220. Gear 214 is engaged with rotor 216, gear 210 and gear 218.

Paddle 106 is non-rotatably connected to a component of unit 202. For example, protrusions 116 for paddle 106 are disposed in slots 220. Unit 202 operates as is known in the art. For example, engine E and crankshaft CK for vehicle V transmit torque T1, for example via belt or chain BL engaged with teeth 222 for gear 210, in direction CD1 to input gear 210 to rotate gear 218 and camshaft C in direction CD1.

For the phase adjusting mode shown in FIG. 2, pin 108 is displaced in direction AD2 to disengage feature 110 from bolt 204 and bolt 204 is rotatable with respect to paddle 106. As is known in the art, motor 102 rotates shaft 104, paddle 106 and shaft 212 in circumferential direction CD1 or CD2 to control phasing (circumferential position) of camshaft C with respect to crankshaft CK. For example, paddle 106 rotates in circumferential directions CD1 or CD2 according to control signal CS1 from electronic control unit ECU for vehicle V. In the example of FIG. 2: rotating shafts 104 and 212 in direction CD1 rotates gear 218 and camshaft C in direction CD1, with respect to gear 210, to advance phasing of camshaft C; and rotating shaft 104 and shaft 212 in opposite direction CD2 rotates gear 218 and camshaft C in direction CD2, with respect to gear 210, to retard phasing of camshaft C. It should be understood that torque T1 is shown in direction CD1 for purposes of illustration only and that torque T1 could be shown in a opposite direction CD2.

Figure 6:
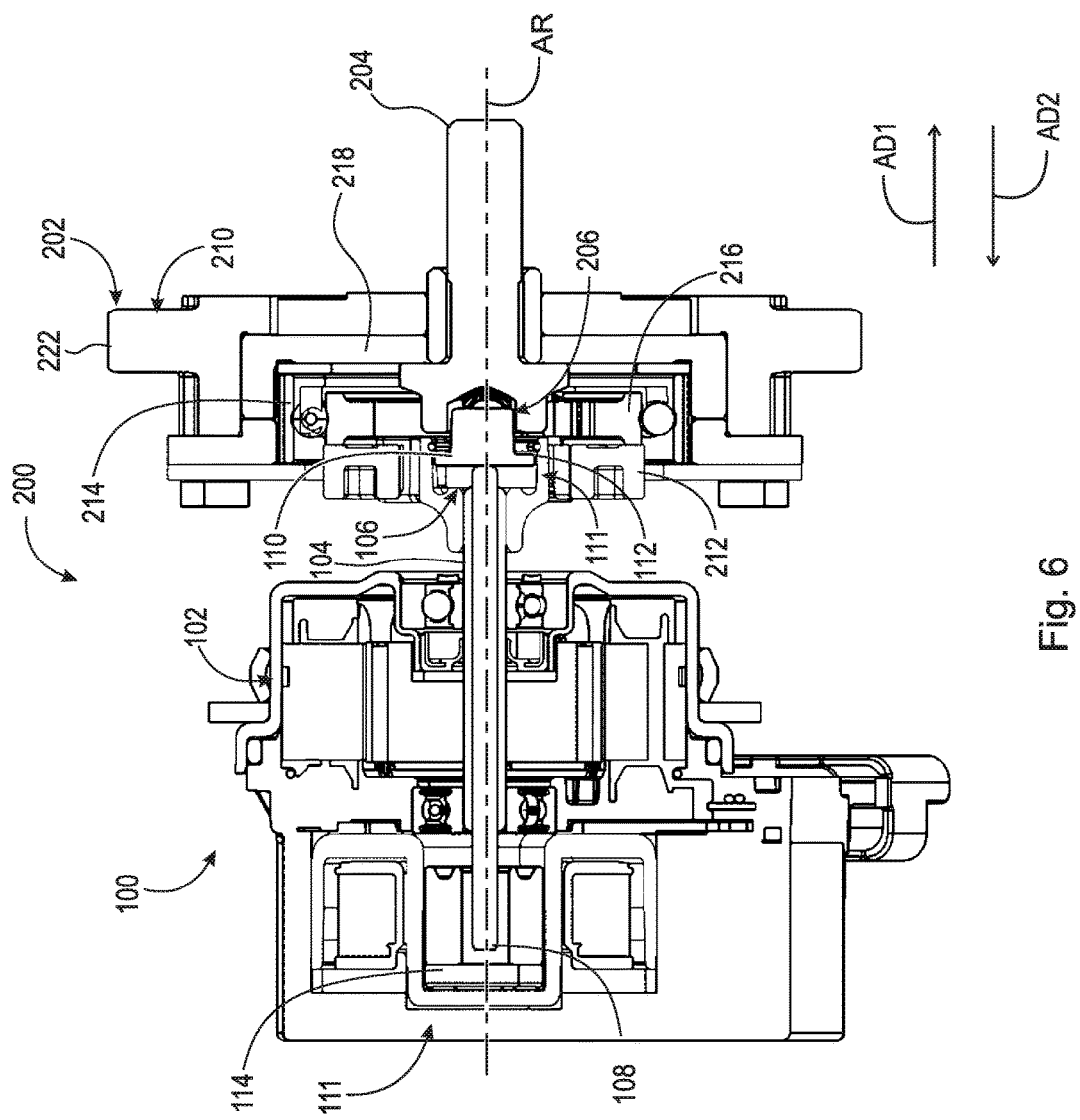
FIG. 6 is a cross-sectional view of the cam phasing control assembly of FIG. 2 in a camshaft locking mode; and, FIG. 7 is a perspective view of a cylindrical coordinate system demonstrating spatial terminology used in the present application.

FIG. 6 is a cross-sectional view of cam phasing control assembly 200 of FIG. 2 in a camshaft locking mode. The following should be viewed in light of FIGS. 1 through 6. For the camshaft locking mode shown in FIG. 6, which occurs as engine E is shutting down, actuator 114 displaces actuating pin 108 in axial direction AD1 to non-rotatably connect engagement feature 110 with bolt 204. For example, actuator 114 receives control signal CS2 from unit ECU and protrusions 116 are inserted into respective slots 208. In the camshaft locking mode, gear 210 and camshaft C are non-rotatably connected. That is, camshaft C does not rotate with respect to gear 210 and crankshaft CK. The camshaft locking mode is further discussed below.

Resilient element 112 urges feature 110 in direction AD2, opposite direction AD1. For the phase adjusting mode: actuator 114 displaces pin 108 in direction AD2, opposite direction AD1, or releases force urging pin 108 in direction AD1; and resilient element 112 displaces actuating pin 108 in axial direction AD2. For the camshaft locking mode, actuator 114 overcomes force from element 112 to displace pin 108 in direction AD1.

In the example of FIG. 6, for the camshaft locking mode, actuator 114 axially displaces engagement feature 110 in direction AD1 with respect to paddle 106. In the example of FIG. 2, for the phase adjusting mode, resilient element 112 axially displaces engagement feature 110 in direction AD2 with respect to paddle 106.

In an example embodiment: engagement feature 110 includes at least one radially outwardly extending protrusion 118. For the camshaft locking mode, actuator 114 displaces the at least one radially outwardly extending protrusion 118, in direction AD1, into slot(s) 208. Thus, the at least one radially outwardly extending protrusion 118 non-rotatably connects engagement feature 110 with bolt 204.

For the phase adjusting mode, resilient element 112 axially off-sets the at least one radially outwardly extending protrusion 118 from slot(s) 208. Stated otherwise, for the phase adjusting mode, resilient element 112 displaces engagement feature 110 in direction AD2 so that the at least one radially outwardly extending protrusion 118 clears, or is disengaged from, slot(s) 208 to enable rotation between paddle 106 and bolt 204. In an example embodiment, engagement feature 110 includes six protrusions 118 and recess 206 includes six slots 208. It should be understood that engagement feature 110 is not limited to a particular number of protrusions 118 and recess 206 is not limited to a particular number of slots 208. It should be understood that the number of protrusions 118 does not necessary equal the number of slots 208, for example (not shown), the number of protrusions 118 can be less than the number of slots 208.

In an example embodiment (not shown), feature 110 is a recess with at least one slot and bolt 204 includes at least one protrusion arranged to non-rotatably connect to the at least slot. That is, feature 110 is disposed about bolt 204 in the camshaft locking mode.

The following should be viewed in light of FIGS. 1 through 6. The following describes a method of operating cam phasing control motor assembly 100. Although the method is presented as a sequence of steps for clarity, no order should be inferred from the sequence unless explicitly stated. A first step receives, from engine E and with input gear 210 for gearbox phasing unit 202, torque T1 in circumferential direction CD1. A second step, for the phase adjusting mode: displaces, with displacement assembly 111, engagement feature 110 in axial direction AD2; disconnects engagement feature 110 from bolt 204; and rotates, with torque T1 and gearbox phasing unit 202, camshaft C in circumferential direction CD1. A third step, for the camshaft locking mode: displaces, with actuator assembly 111, engagement feature 110 in axial direction AD1; and non-rotatably connects engagement feature 110 and bolt 204. Non-rotatably connecting engagement feature 110 and bolt 204 includes non-rotatably connecting input gear 210 and camshaft C.

In an example embodiment, cam phasing control motor assembly 100 includes connection element 106 non-rotatably connected to hollow drive shaft 104. Then, a fourth step, for the phase adjusting mode: rotates, using electric motor 102, connection element 106; and rotates, using connection element 106, camshaft C with respect to input gear 210.

In an example embodiment: cam phasing control motor assembly 100 includes connection element 106 non-rotatably connected to hollow drive shaft 104 and displacement assembly 111 includes actuator 114 and resilient element 112. Then: displacing engagement feature 110 in axial direction AD2 includes displacing, with resilient element 112, engagement feature 110 with respect to connection element 106; and displacing, with actuator assembly 111, engagement feature 110 in axial direction AD1 includes displacing, with actuator 114, engagement feature 110 in axial direction AD1 with respect to connection element 106.

The following should be viewed in light of FIGS. 1 through 6. The following describes a method of operating cam phasing control motor assembly 100. Although the method is presented as a sequence of steps for clarity, no order should be inferred from the sequence unless explicitly stated. A first step receives, from engine E and with input gear 210 for gearbox phasing unit 202, torque T1 in circumferential direction CD1. A second step, for the phase adjusting mode: displaces, with actuator 112, engagement feature 110 in axial direction AD2; disconnects engagement feature 110 from bolt 204; rotates, with torque T1 and gearbox phasing unit 202, camshaft C in circumferential direction CD1; and enables relative rotation between connection element 106 and bolt 204. A third step, for the camshaft locking mode: displaces, with element 112, engagement feature 110 in axial direction AD1; and non-rotatably connects engagement feature 110 and bolt 204. Non-rotatably connecting engagement feature 110 and bolt 204 includes non-rotatably connecting input gear 210 and camshaft C.

A fourth step, for the camshaft locking mode, non-rotatably connects paddle 106 and gear 210. A first step, for the phase adjusting mode, rotates, with motor 102, paddle 106 to change a circumferential position of camshaft C with respect to gear 210.

In an example embodiment: displacing engagement feature 110 in axial direction AD2 includes displacing, with resilient element 112, engagement feature 110 in direction AD2 with respect to connection element 106; and displacing, with actuator assembly 111, engagement feature 110 in axial direction AD1 includes displacing, with actuator 114, engagement feature 110 in axial direction AD1 with respect to connection element 106.

The following should be viewed in light of FIGS. 1 through 6. The following describes a method of operating cam phasing control assembly 200 including cam phasing control motor assembly 100. A first step receives, from engine E and with input gear 210, torque T1 in circumferential direction CD1. A second step, for the phase adjusting mode: displaces, with displacement assembly 111, engagement feature 110 in axial direction AD2; rotates, with torque T1 and gearbox phasing unit 202, camshaft C in the circumferential direction CD1; and enables rotation between camshaft C and input gear 210. A third step, for the camshaft locking mode: displaces, with displacement assembly 111, actuating pin 108 and engagement feature 110 in axial direction AD1; non-rotatably connects engagement feature 110 and bolt 204; and non-rotatably connects input gear 210 and camshaft C.

Cam phasing control motor assembly 100 and a method using assembly 100 address the problem noted above of "drift" of the rotor for an electric camshaft phaser relative to the stator for the electric camshaft phaser immediately or shortly after engine shut-down. For example, assembly 100 remains in the phase adjusting mode (feature 110 disengaged from bolt 204) until an engine shutdown is determined to be imminent, for example, when engine speed drops to 150 rpm. At this point, the camshaft locking mode is initiated and control signal CS2 is transmitted from unit ECU to actuator 114. Actuator 114 displaces pin 108 and feature 110 in direction AD1 to non-rotatably connect feature 110 and bolt 204, locking camshaft C in a pre-determined position facilitating the next engine start-up. Stated otherwise, the non-rotatable connection of feature 110 with bolt 204 effectively causes input gear 210 to be paired directly to output gear 218, resulting in a 1:1 ratio between gear 210 and gear 218. The preceding ratio effectively non-rotatably connects gear 210 and gear 218 and blocks rotation of camshaft C with respect to crankshaft CK.

At engine start-up, when unit ECU determines that cam phasing control should occur, the phase adjustment mode is initiated and control signal CS3 is transmitted from unit ECU to actuator 114. Actuator 114 displaces pin 108 in direction AD2 and resilient element 112 displaces feature 110 in direction AD2 to disengage feature 110 from bolt 204.

There are a limited number of circumferential positions for camshaft C included in the plurality of camshaft positions noted above. The number of circumferential positions is related to the number of protrusions 118 and slots 208. For example, the number of protrusions 118 and slots 208 are determined according to the requirements of engine E. For example, feature 110 is shown with six possible orientations of protrusions 118 and slots 208. If unit 202 has a 70:1 ratio, then there are 420 possible locked positions per rotation of camshaft C (70×6). This gives a resolution of about 0.86° Cam (1.71° Crank)(360/420). A modification of the mating feature will increase this resolution.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
C cam shaft
CS1 control signal
CS2 control signal
CS3 control signal
CK crankshaft
E engine
T1 torque from engine E
T2 torque from electric motor 102
V vehicle
100 cam phasing control motor assembly
102 electric motor
104 hollow drive shaft
106 paddle
108 actuating pin
110 engagement feature
111 displacement assembly
112 resilient element
114 actuator
116 protrusion for connection element 106
118 protrusion for feature 110
200 cam phasing control assembly
202 gearbox phasing unit
204 bolt
206 recess in bolt 204
208 slot in recess 206
210 input gear
212 control shaft
214 flexible gear
216 rotor
218 output gear
220 slot in shaft 212
222 teeth on gear 210

The invention claimed is:

1. A cam phasing control motor assembly, comprising:
an electric motor with a hollow drive shaft;
an actuating pin passing through the hollow drive shaft;
an engagement feature; and,
a displacement assembly, wherein:
for a camshaft locking mode:
the displacement assembly displaces the actuating pin in a first axial direction to non-rotatably connect the engagement feature with a bolt non-rotatably connected to a camshaft; and,
the camshaft is arranged to non-rotatably connect to an input gear for a gearbox phasing unit, the input gear arranged to receive torque from an engine; and,
for a phase adjusting mode:
the displacement assembly displaces the actuating pin in a second axial direction, opposite the first axial direction, to disconnect the engagement feature from the bolt; and,
the camshaft is arranged to rotate with respect to the input gear.

2. The cam phasing motor control assembly of claim 1, wherein:
the displacement assembly includes:
an actuator; and,
a resilient element;

for the camshaft locking mode, the actuator displaces the actuating pin and the engagement feature in the first axial direction; and, for the phase adjusting mode, the resilient element displaces the engagement feature and the actuating pin in the second axial direction.

3. The cam phasing motor control assembly of claim 1, further comprising:

a connection element non-rotatably connected to the hollow drive shaft and arranged to non-rotatably connect to a component of the gearbox phasing unit, wherein for the phase adjusting mode, the electric motor rotates the connection element to control a circumferential position of the camshaft with respect to the input gear.

4. The cam phasing motor control assembly of claim 3, wherein:

for the camshaft locking mode, the displacement assembly displaces the engagement feature in the first axial direction with respect to the connection element; and, for the phase adjusting mode, the displacement assembly displaces the engagement feature in the second axial direction with respect to the connection element.

5. The cam phasing motor control assembly of claim 3, wherein at least a portion of the engagement feature is located within the connection element.

6. The cam phasing motor control assembly of claim 1, wherein:

the engagement feature includes at least one radially outwardly extending protrusion;

the bolt includes a recess with at least one radially outwardly extending slot;

for the camshaft locking mode, the displacement assembly displaces the at least one radially outwardly extending protrusion into the at least one radially outwardly extending slot; and, for the phase adjusting mode, the displacement assembly axially off-sets the at least one radially outwardly extending protrusion from the at least one radially outwardly extending slot.

7. A cam phasing control motor assembly, comprising:
an electric motor with a hollow drive shaft;
a connection element non-rotatably connected to the hollow drive shaft and arranged to connect to a gearbox phasing unit, the gearbox phasing unit including an input gear arranged to receive torque from an engine;
an actuating pin passing through the hollow drive shaft;
an engagement feature non-rotatably connected to the connection element;
a resilient element engaged with the engagement feature; and,
an actuator, wherein:
for a camshaft locking mode, the actuator displaces the actuating pin and the engagement feature in a first axial direction to non-rotatably connect the engagement feature with a bolt non-rotatably connected to a camshaft; and,
for a phase adjusting mode, the resilient element displaces the engagement feature in a second axial direction, opposite the first axial direction, to enable relative rotation between the connection element and the bolt.

8. The cam phasing motor control assembly of claim 7, wherein:

for the camshaft locking mode, the connection element is non-rotatably connected to the input gear; and, for the phase adjusting mode, the electric motor rotates the connection element to change a circumferential position of the camshaft with respect to the input gear.

9. The cam phasing motor control assembly of claim 7, wherein for the camshaft locking mode, the input gear is non-rotatably connected to the camshaft.

10. The cam phasing motor control assembly of claim 7, wherein at least a portion of the engagement feature is located within the connection element.

11. The cam phasing motor control assembly of claim 7, wherein:

for the camshaft locking mode, the actuator axially displaces the engagement feature with respect to the connection element; and, for the phase adjusting mode, the resilient element axially displaces the engagement feature with respect to the connection element.

12. A cam phasing control assembly, comprising:
a gearbox phasing unit including:
an input gear arranged to receive torque from an engine; and,
an output gear arranged to non-rotatably connect to a camshaft; and,
a cam phasing control motor assembly including:
an electric motor with a hollow drive shaft;
an actuating pin passing through the hollow drive shaft;
an engagement feature; and,
a displacement assembly, wherein:
for a camshaft locking mode, the displacement assembly displaces the actuating pin and the engagement feature in a first axial direction to non-rotatably connect the engagement feature with a bolt non-rotatably connected to a camshaft; and,
for a phase adjusting mode, the displacement assembly displaces the engagement feature in a second axial direction, opposite the first axial direction, to enable relative rotation between the camshaft and the input gear.

13. The cam phasing control assembly of claim 12, further comprising:

a connection element non-rotatably connected to the hollow drive shaft, wherein:

for the camshaft locking mode, the connection element, the input gear and the camshaft are non-rotatably connected; and, for the phase adjusting mode, the electric motor rotates the connection element:

in a first circumferential direction to rotate the camshaft, with respect to the input gear, in the first circumferential direction; and, in a second circumferential direction, opposite the first circumferential direction, to rotate the camshaft, with respect to the input gear, in the second circumferential direction.

14. The cam phasing control assembly of claim 12, further comprising:

a connection element non-rotatably connected to the hollow drive shaft, wherein the engagement feature is non-rotatably connected to the connection element.

15. The cam phasing control assembly of claim 12, further comprising:

a connection element non-rotatably connected to the hollow drive shaft, wherein:

the displacement assembly includes:
an actuator; and,
a resilient element;

for the camshaft locking mode, the actuator displaces the engagement feature in the first axial direction with respect to the connection element; and, for the phase adjusting mode, the resilient element displaces the engagement feature in the second axial direction with respect to the connection element.

16. A method of operating the cam phasing control assembly of claim 12, comprising:

receiving, from the engine and with the input gear, torque in a first circumferential direction;

for the phase adjusting mode:
  displacing, with the displacement assembly, the engagement feature in the second axial direction;
  rotating, with the torque and the gearbox phasing unit, the camshaft in the first circumferential direction; and,
  enabling rotation between the camshaft and the input gear; and, for the camshaft locking mode:
  displacing, with the displacement assembly, the actuating pin and the engagement feature in the first axial direction;
  non-rotatably connecting the engagement feature and the bolt; and,
  non-rotatably connecting the input gear and the camshaft.

17. A method of operating the cam phasing control motor assembly of claim 1, comprising:

receiving, from the engine and with the input gear for the gearbox phasing unit, the torque in a first circumferential direction;

for the phase adjusting mode:
  displacing, with the displacement assembly, the engagement feature in the second axial direction;
  disconnecting the engagement feature from the bolt; and,
  rotating, with the torque and the gearbox phasing unit, the camshaft in the first circumferential direction; and, for the camshaft locking mode:
  displacing, with the displacement assembly, the engagement feature in the first axial direction; and,
  non-rotatably connecting the engagement feature and the bolt.

18. The method of claim 17, wherein:

the cam phasing control motor assembly includes a connection element non-rotatably connected to the hollow drive shaft, the method further comprising:

for the phase adjusting mode:
  rotating, using the electric motor, the connection element; and,
  rotating, using the connection element, the camshaft with respect to the input gear.

19. The method of claim 17, wherein:

the cam phasing control motor assembly includes a connection element non-rotatably connected to the hollow drive shaft;

the displacement assembly includes:
  an actuator; and,
  a resilient element;

displacing, with the displacement assembly, the engagement feature in the second axial direction includes displacing, with the resilient element, the engagement feature with respect to the connection element; and, displacing, with the displacement assembly, the actuating pin in the first axial direction includes displacing, with the actuator, the engagement feature in the first axial direction with respect to the connection element.

20. The method of claim 17, wherein non-rotatably connecting the engagement feature and the bolt includes non-rotatably connecting the input gear and the camshaft.

* * * * *